Oct. 11, 1949.     C. W. SINCLAIR     2,484,532
TIRE AND RIM CONSTRUCTION

Filed May 8, 1944     2 Sheets-Sheet 1

INVENTOR.
CHARLES W. SINCLAIR

BY

ATTORNEYS

Oct. 11, 1949.

C. W. SINCLAIR 2,484,532

TIRE AND RIM CONSTRUCTION

Filed May 8, 1944

INVENTOR.
CHARLES W. SINCLAIR

BY

ATTORNEYS

Patented Oct. 11, 1949

2,484,532

UNITED STATES PATENT OFFICE 2,484,532

TIRE AND RIM CONSTRUCTION

Charles W. Sinclair, Detroit, Mich., assignor to Kelsey-Hayes Wheel Company, Detroit, Mich., a corporation of Delaware Application May 8, 1944, Serial No. 534,603

1 Claim. (Cl. 152—394)

The invention relates to tire constructions and refers more particularly to pneumatic tire constructions.

The invention has for some of its objects to provide an improved tire construction which may be readily mounted on or demounted from a rim member; and to provide an improved tire construction which is radially flexible to substantially conform to and seat on the rim member in an annular zone to be concentric with the rim member and also concentric with the wheel having the rim member.

The invention has for other objects to provide a tire construction which comprises a tire casing and a band cooperating with the tire casing to retain air under pressure and which is lighter in weight than a tire comprising the same size tire casing and an inner tube of the proper size; and to provide a tire construction which may be safely handled without danger to the operator while the tire construction is inflated and being mounted on or demounted from the rim member or the carrier.

The invention has for further objects to provide a tire construction for use with a divided rim member having its band sufficiently strong to retain its tire casing when inflated and relieved from load, but requiring the rim member to retain its tire casing when inflated and under load; and to provide a tire construction which is axially flexible to permit, if necessary, the annular sections of the rim member to be properly positioned with respect to each other under normal operating conditions.

With these and other objects in view, the invention resides in the novel features of construction and combinations and arrangements of parts as more fully hereinafter set forth.

The tire construction embodying the invention is a tire construction for vehicles and, more particularly, motor vehicles.

Figure 1:
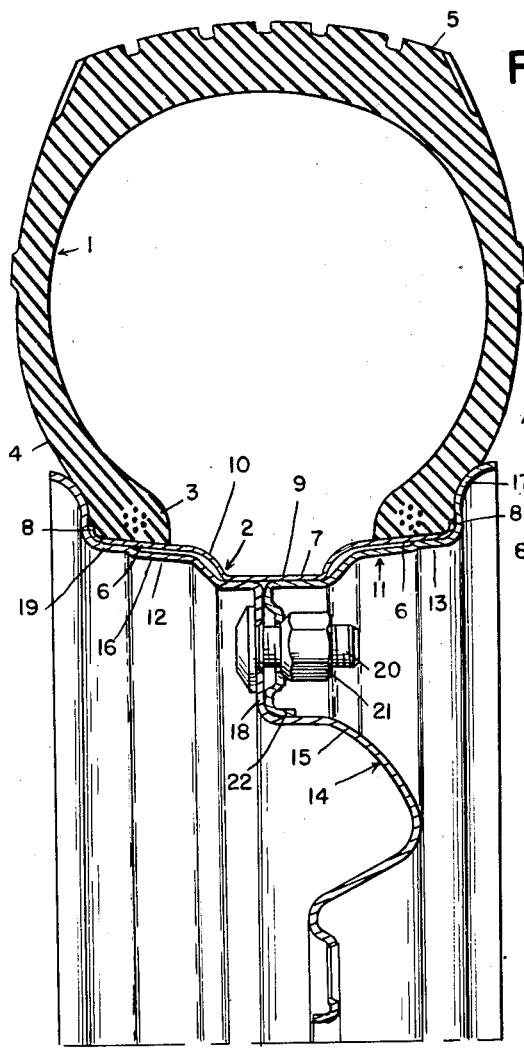
Figure 1 is a transverse section through a tire construction embodying the invention and applied to a rim member and wheel.
Figure 2:
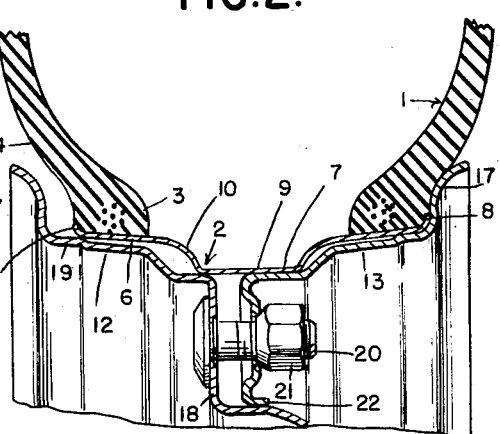
Figure 2 is a similar view showing parts in a different position during assembly.

As illustrated in Figures 1 and 2, the tire construction comprises the tire casing 1 and the band 2, both being impervious to air and cooperating with each other to retain air under pressure, thereby eliminating the usual inner tube. The tire casing 1 has the inextensible beads 3, the side walls 4 and the tread 5. The band 2 is an endless relatively thin light weight annular member preferably formed of sheet steel. The band has a base formed of the generally axial base portions 6 and the annular well 7 between the base portions. The band also has the generally radially outwardly extending portions 8 at the axially outer edges of the base portions. The base portions 6 are flared axially outwardly to extend at an angle of approximately 5 degrees to the axis of the band and the base portions engage and fit the radially inner faces of the beads 3. The annular well 7 has the generally axially extending bottom wall 9 and the side walls 10, which latter normally flare radially and axially outwardly from the bottom wall to the base portions 6. The annular well has a width and depth to enable mounting and demounting the tire casing on the band. The generally radially outwardly extending portions 8 are flanges engaging the axially outer faces only of the beads 3 to retain the tire casing on the band.

The construction of the band is such that its weight is less than that of the proper inner tube for the tire casing which cooperates with the band to form the air retaining tire construction. At the same time, the band has a strength sufficient to enable its flanges to retain the tire casing on the band when the tire casing is inflated at approximately the usual pressure and also when the tire casing is not subject to load of the vehicle on its tread. As a result, another support is required for the tire casing when the tire construction is under normal operating conditions, at which time it is inflated and subject to load of the vehicle. The added support is the rim member 11 which is formed of the two annular sections 12 and 13. The annular sections form parts of a divided wheel 14 to reduce the total weight of the wheel, the rim member and the tire construction. As shown, the annular section 12 is integral with the body 15 of the wheel and the annular section 13 is attachable to and detachable from the body 15 of the wheel. Each annular section has the generally axially extending base portion 16, the generally radially outwardly extending flange 17 and the generally radially inwardly extending attachment portion 18. The base portion 16 is preferably formed with the radially outwardly raised annular part 19 adjacent the flange 17 and flared axially outwardly to extend at an angle of approximately 5 degrees to the axis of the wheel. To detachably secure the annular sections 12 and 13 to each other, there are the bolts 20 and the nuts 21, the former extending transversely through the attachment portions and being secured to the attachment portion of the annular section 12 and the latter being threaded on the former and engaging the attachment portion of the annular section 13. The attachment portions abut in the normal operating position and under normal operating conditions of the rim member and tire construction and the flanges 17 are spaced a predetermined distance apart. The annular section 12 is concentric with the wheel, as is also the annular section 13, it being noted that the attachment portion of the latter section is provided with a pilot flange 22 at its radially inner edge for engaging the wheel body 15 and relieving the securing bolts 20 from radial shear.

The band 2 is constructed to have a sufficient strength to retain the tire casing on the band when the tire casing is normally inflated and relieved from vehicular load on its tread. At the same time, the band is constructed to be radially flexible to enable it to radially flex so that its base portions 6 may substantially conform to and fit the annular parts 19 of the base portions 16 of the rim under normal operating conditions. Furthermore, the band is axially flexible, particularly by reason of its well 7 and especially the transversely extending side walls 10 of its well, to enable the band to axially flex and axially shorten, if necessary, so that its tire casing retaining flanges 8 will not interfere with the tire casing retaining flanges 17 when the annular sections 12 and 13 of the rim member are secured against each other. It will be further noted that the flanges 17 extend generally radially outwardly beyond the flanges 8 to engage the side walls 4 of the tire casing so that when the parts are in their normal operating positions the flanges 17 retain the tire casing on the rim member and carry the stresses to which they are subjected by reason of the flexing of the tire casing side walls about the flanges. As a result, the band is made relatively light in weight, it having a weight less than that of the proper size of inner tube for the tire casing which is mounted on the band. Furthermore, the annular sections of the rim member which form parts of the wheel assure accurate centering of the annular sections and assist in forming the wheel and rim member of relatively light weight. There is, therefore, a material saving in unsprung weight. By reason of the tire construction being demountable there is no necessity of a rim member or wheel carrying the same when not in operation so that they can be eliminated.

Figure 2 illustrates the position of the parts during assembly, at which time it will be noted that the tire casing 1 is properly mounted on the band 2 and inflated and the tire casing and band unit assembly are partially mounted on the annular sections 12 and 13 of the rim member, these annular sections being in the state of being relatively moved axially toward each other by tightening down the nuts 21. It will be noted that the tire casing retaining flange 17 of the annular section 13 engages the side wall 4 of the tire casing and that on continued movement of the annular section 13 towards the annular section 12 the band 2 is moved by means of the tire casing and its bead engaging flange 8 at the side remote from the flange adjacent the flange 17 of the annular section 13. It will thus be seen that the band is subject to uniform pressure throughout its circumferential extent and also placed under tension while being mounted in normal operating position on the rim member. Since the band is radially flexible, it is apparent that its base portions 6 will substantially conform to and fit the base portions 16 of the annular rim sections in annular zones so that the band in normal operating position will be concentric with the rim member and wheel. By reason of the annular well axial flexing of the band is facilitated to thereby avoid interference with the clamping of the annular sections of the rim to each other. It is apparent that when the nuts 21 are removed from the bolts 20 the tire casing cannot force the rim section 13 outwardly to endanger the operator since the band retains the tire casing, although it may be inflated.

Figure 3:
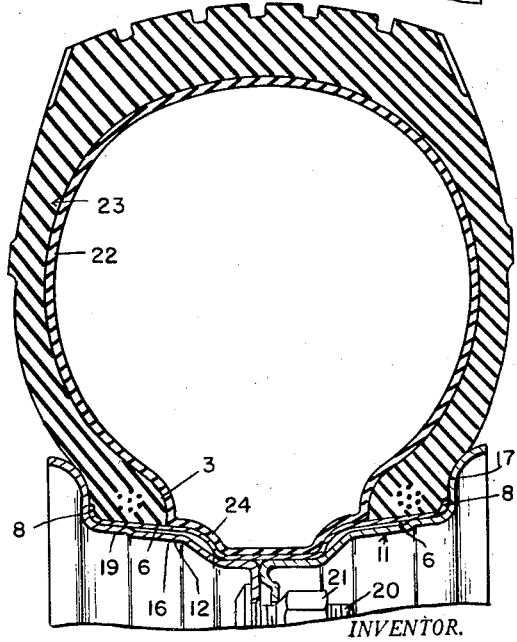
Figure 3, 4, 5 and 6 are views similar to Figure 1 showing modifications.

The modification illustrated in Figure 3 differs from that illustrated in Figures 1 and 2 mainly in showing that the inner tube 22 may be used along with the tire casing 23 and the band 24, if this is desired. The construction of the tire casing and band is the same as that of Figures 1 and 2.

Figure 4:
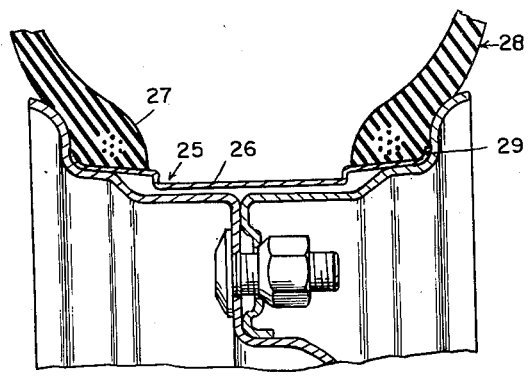

As illustrated in Figure 4, the tire construction differs from that of Figures 1 and 2 mainly in forming the band 25 with a radially inwardly extending annular well 26 having its side walls located in the zone of the axially inner faces of the beads 27 of the tire casing 28. The depth of the well 26 is sufficient to enable assembly of the tire casing with the band by buttoning the beads of the tire casing over the radially outwardly extending flange portions 29 at the axially outer edges of the band.

Figure 5:
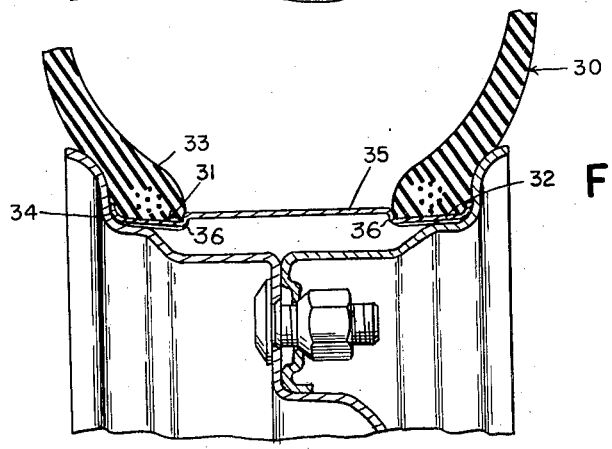

Figure 5 illustrates another modification embodying the same principles and, in addition, the provision of a bead lock in the band. More in detail, 30 is the tire casing and 31 the band which cooperates with the tire casing to retain air under the desired pressure. The band is formed of relatively thin light weight sheet metal in the same manner as the band of Figures 1 and 2 and has the generally axial base portions 32 for engaging and fitting the radially inner faces of the beads 33 of the tire casing 30. The band has at its axially outer edges the retaining flange portions 34 for engaging the axially outer faces of the beads 33. In addition, the band has the integral outwardly depressed annular portion 35 having the edge walls 36 for firmly engaging the axially inner faces of the beads and cooperating with the retaining portions to effectively lock the beads at predeterminedly spaced distances apart. The tire construction of Figure 5 also differs in that the base portions 32 are corrugated with the corrugations extending generally parallel to the axis of the rim member. As a result of the corrugations, the flexibility of the base portions is increased to thereby facilitate flexing and proper seating of the base portions on the base portions of the annular rim sections in annular zones. In assembly, the flange portions 34 and the depressed annular portion 35 are formed after the tire casing has been properly positioned on the band.

Figure 6:
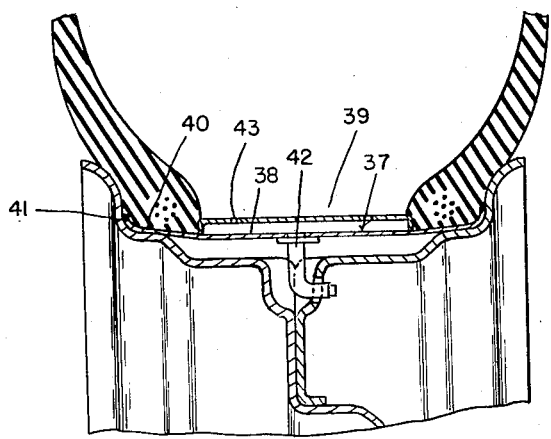

The modification shown in Figure 6 differs essentially from that of Figure 5 in forming the band 37 of the two parts 38 and 39. These parts are relatively thin and also of relatively light weight and provide for radial flexibility of the band to engage and properly fit the base portions of the rim member in annular zones. The part 38 is formed with the base portions 40 for engaging and fitting the radially inner faces of the beads of the tire casing. The part 38 is also formed with the generally radially outwardly extending flanges 41 at its edges for engaging the axially outer faces of the beads. The part 39 is of channel-shaped cross section with the edges of its channel side walls resting on the part 38 and the side walls tightly fitting the axially inner faces of the beads. The part 38 has secured thereto the valve stem 42, the two being preferably brazed together. The part 39 has its channel web formed with the holes 43 for the passage of air. In the assembly of the tire casing and the band, the part 39 of the band is inserted between the beads of the tire casing and then the flanges 41 are bent to tightly engage the axially outer faces of the beads, the construction being such that the part 38 cooperates with the tire casing to retain air under the desired pressure.

What I claim as my invention is:

The combination with a divided rim member having two annular sections each formed with a flange, a base portion and an attachment portion, each of said base portions having an annular part adjacent the associated flange raised radially outwardly beyond the remaining part of the base portion, of a tire construction on said rim member comprising a tire casing and a flexible relatively thin band for said tire casing having base portions, an intermediate annular well and generally radially outwardly extending portions at the axially outer edges of said base portions, said base portions forming seats for the beads of said casing and having their axially outer parts engaging said radially outwardly raised annular parts and said radially outwardly extending portions engaging said flanges, the side walls of said well and adjacent parts of said base portions of said band being spaced from the parts of said base portions of said annular sections opposed to said side walls and adjacent parts, said band having a strength to retain said tire casing when said tire construction is inflated and relieved from load and requiring said rim member when said tire construction is subject to normal operating conditions.

CHARLES W. SINCLAIR.

REFERENCES CITED

The following references are of record in the file of this patent:

UNITED STATES PATENTS

| Number | Name | Date |
|---|---|---|
| 1,305,683 | Ashley | June 3, 1919 |
| 1,377,162 | Forsyth | May 3, 1921 |
| 1,647,205 | Wais | Nov. 1, 1927 |
| 1,966,580 | Bull | July 17, 1934 |
| 2,198,978 | Sauer | Apr. 30, 1940 |

FOREIGN PATENTS

| Number | Country | Date |
|---|---|---|
| 22,300 | Great Britain | 1898 |
| 22,384 | Great Britain | 1896 |
| 35,281 | France | 1929 |
| 221,457 | Great Britain | 1924 |